Sept. 5, 1933.	G. A. DELF	1,925,177
BRAKE DRUM TRUING MACHINE
Filed Nov. 18, 1931	4 Sheets-Sheet 1
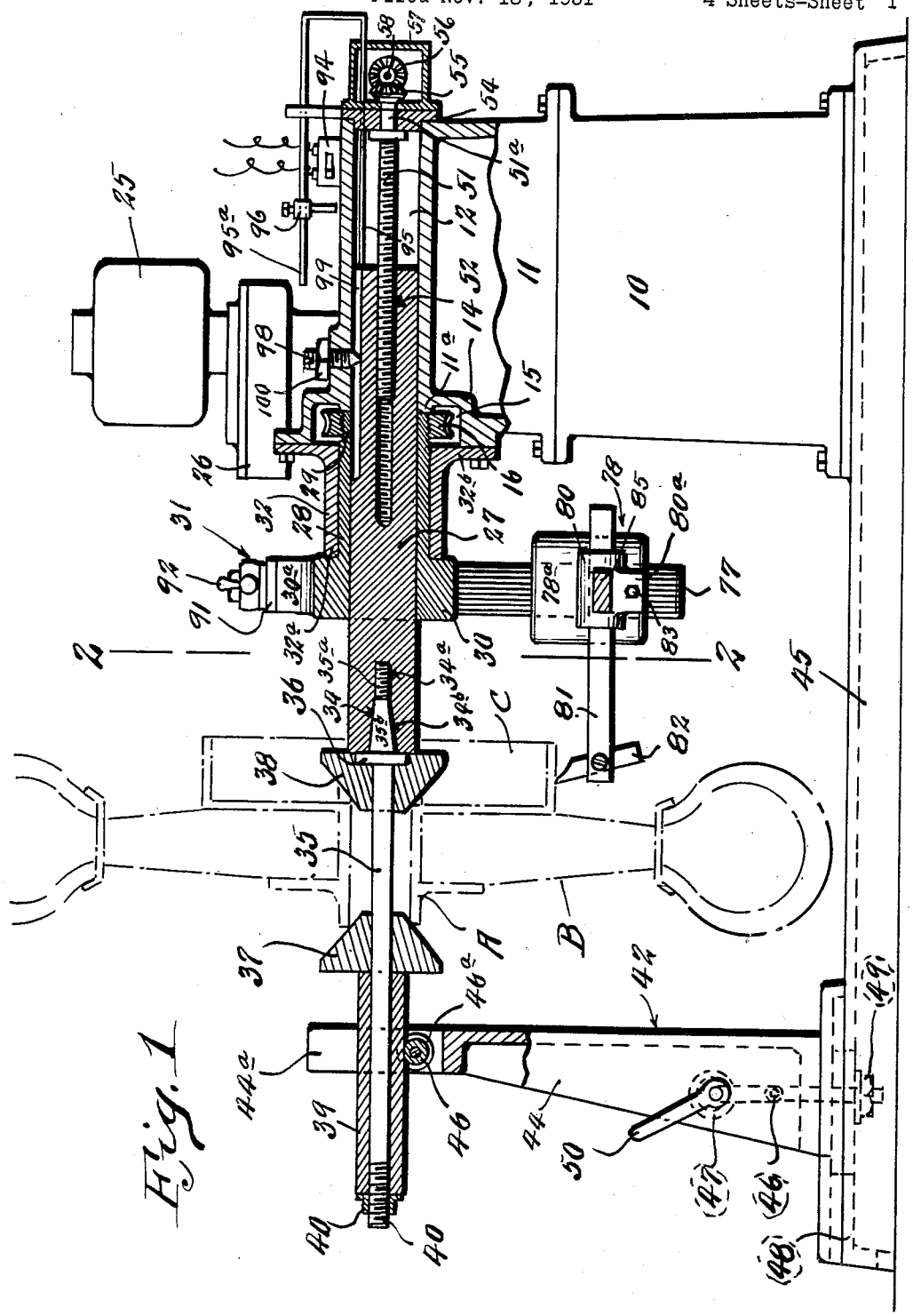
Inventor
George A. Delf
By William Janns Atty Sept. 5, 1933.  G. A. DELF  1,925,177
BRAKE DRUM TRUING MACHINE
Filed Nov. 18, 1931  4 Sheets-Sheet 2
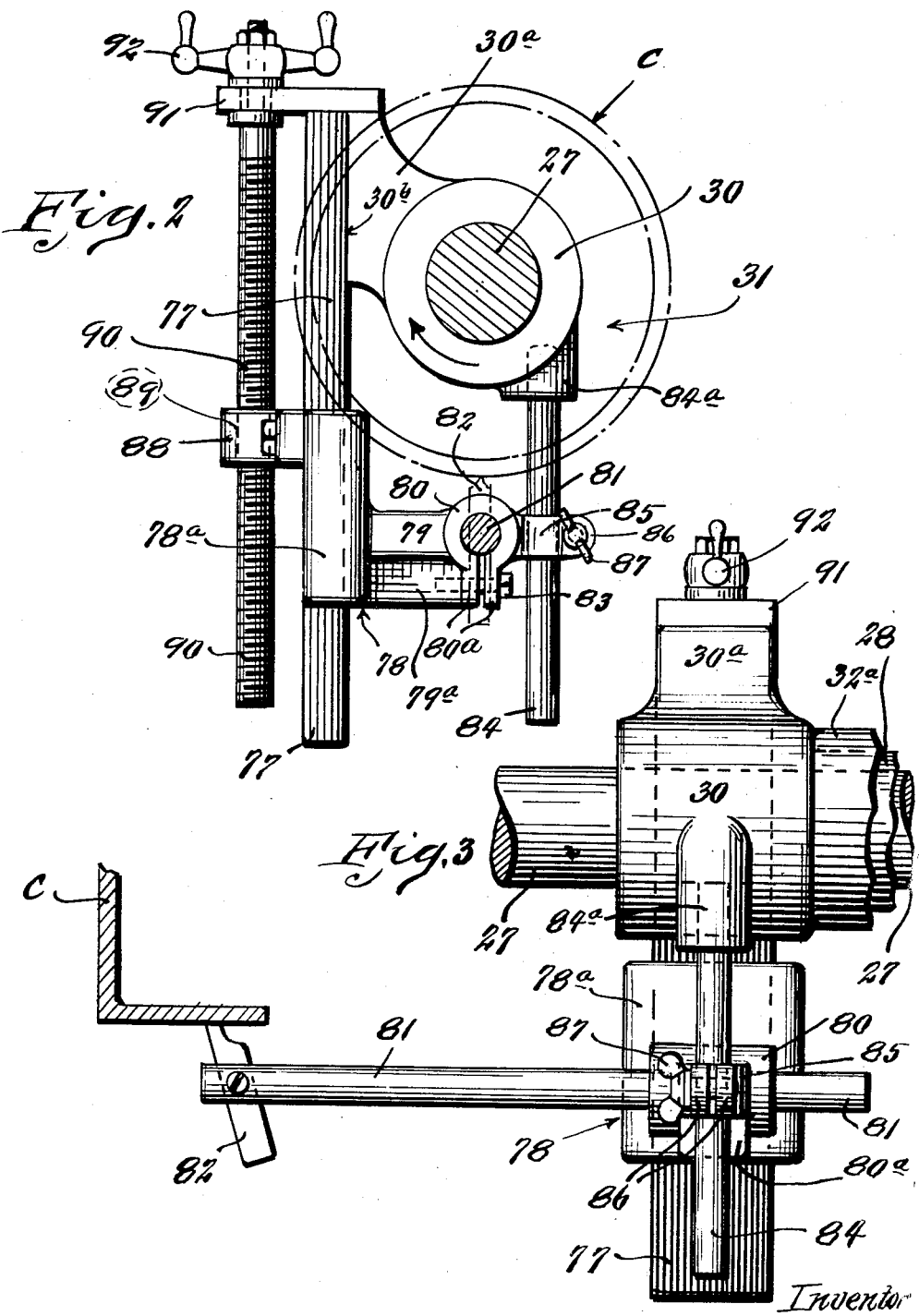

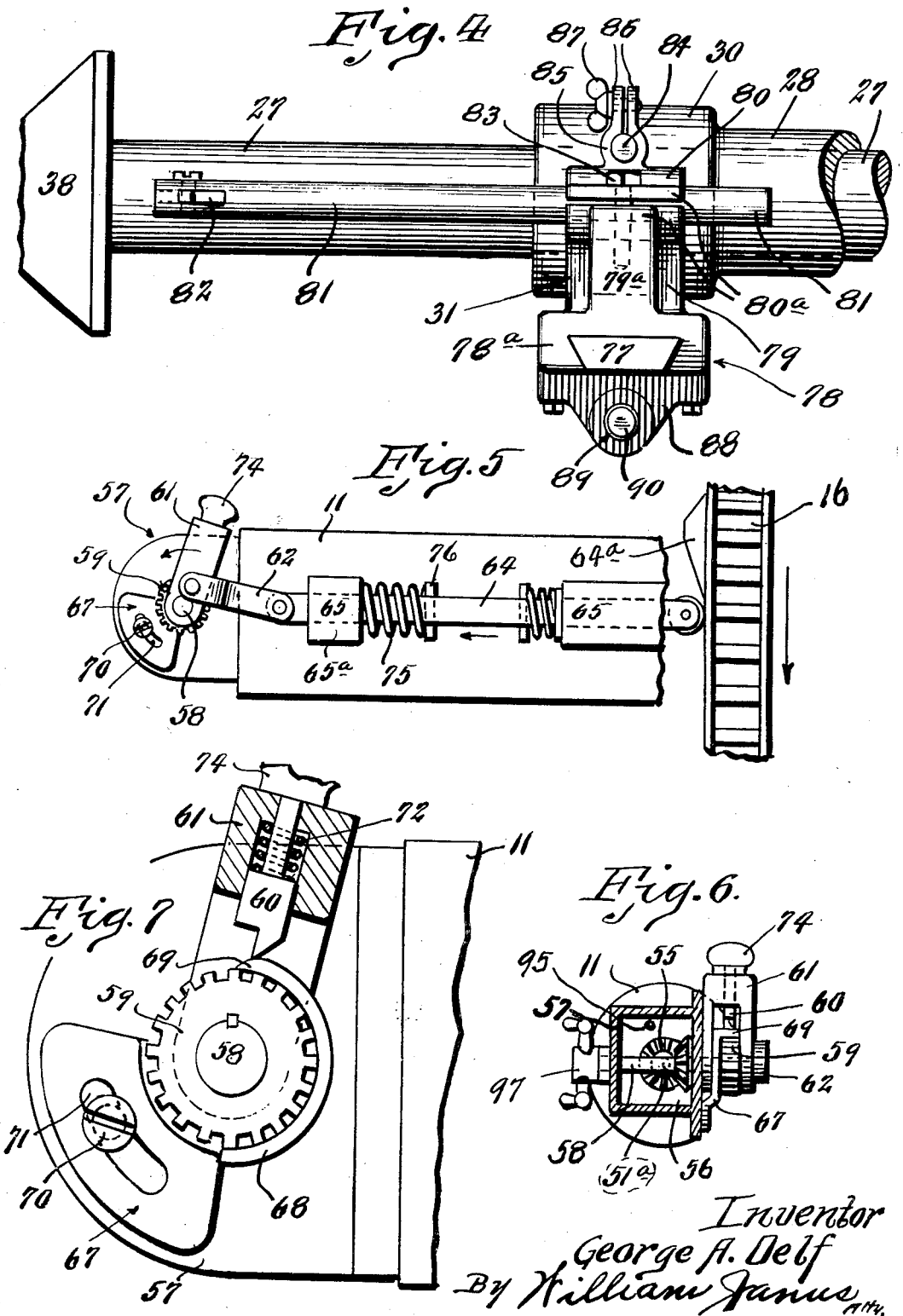

Sept. 5, 1933.　　　　　G. A. DELF　　　　　1,925,177
BRAKE DRUM TRUING MACHINE
Filed Nov. 18, 1931　　　　4 Sheets-Sheet 4
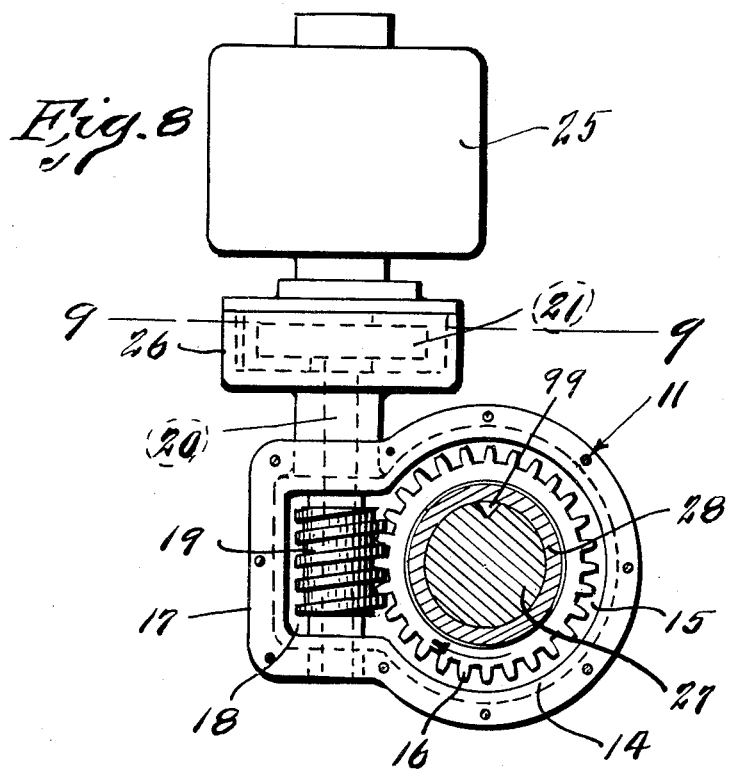
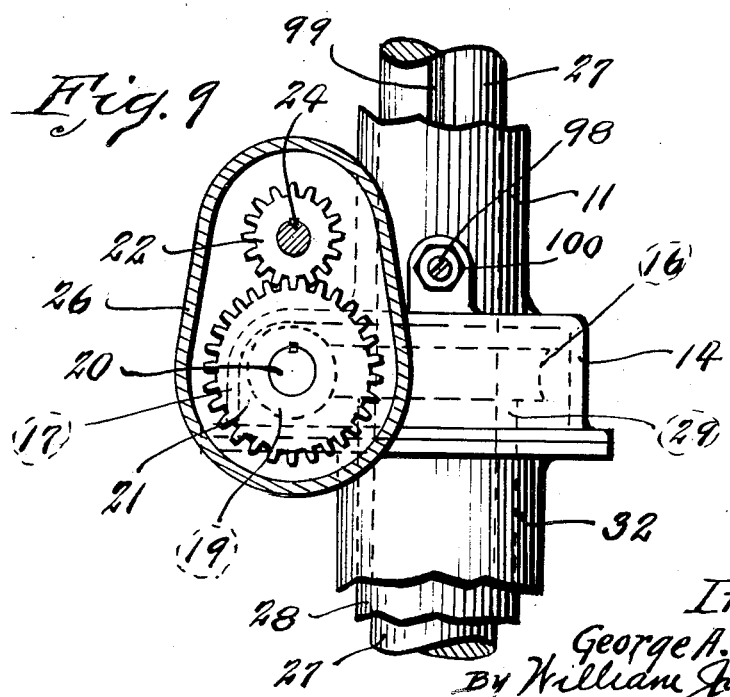
Inventor
George A. Delf
By William James Atty.

Patented Sept. 5, 1933

1,925,177

UNITED STATES PATENT OFFICE 1,925,177

BRAKE DRUM TRUING MACHINE

George A. Delf, St. Louis, Mo.

Application November 18, 1931
Serial No. 575,747

15 Claims. (Cl. 82—2)

This invention relates to brake drum truing machines.

The primary objects of the invention are to provide a machine for truing or refinishing brake drums for automobiles, which machine is of simple but rugged construction, is easy to adjust and operate, and which is so constructed that the vibration and chattering is reduced to minimum and a smooth cut is provided.

Other objects of the invention are to provide a brake drum truing machine which can be used for operating upon brake drums of car trucks as well as passenger cars without requiring any changes or replacements in the machine itself.

Still other objects of the invention are so to mount the tool holder that the vibration thereof is reduced to minimum and all chattering is eliminated, thereby insuring a smooth cut and efficient operation of the machine.

Further objects of the invention are to provide a machine of the class described wherein the brake drum is held stationary and the cutting tool is caused to revolve and to provide ample bearing surface for the rotatable support of the tool holder whereby the tool is held steady at all times and forms a smooth cut on the brake drum.

Still further objects of the invention are to provide a brake drum truing machine having a simple and accurate feed mechanism for the tool holder for moving the brake drum relatively to the tool holder.

Additional objects of the invention are generally to improve upon the construction of machines of the class described and to increase the efficiency thereof and insure accurate operation.

With these and other objects in view, my invention consists in certain novel features of construction and arrangement of parts, hereinafter more fully described and claimed, and illustrated in the accompanying drawings, in which—

Figure 1 is a side elevational view of my machine, with parts thereof shown in cross section.

Figure 2 is an enlarged vertical cross section taken on line 2—2 of Figure 1.

Figure 3 is a top plan view of Figure 2, and showing the cutting tool in engagement with a fragmental portion of the brake drum.

Figure 4 is a side elevational view of Figure 3 the direction indicated by arrow in Figure 3.

Figure 5 is a detail side elevational view of the feed actuating mechanism.

Figure 6 is an end elevational view of same.

Figure 7 is an enlarged detail view, partly in cross section, showing the means for regulating the operating movement of the feed mechanism.

Figure 8 is a vertical cross section showing the motor drive.

Figure 9 is a horizontal cross section taken on line 9—9 of Figure 8.

Referring by numerals to the accompanying drawings, 10 indicates a base on which is mounted a support 11 having a horizontally disposed bore 12 of comparatively large diameter. The forward end of this support is formed with a worm gear housing 14 having a chamber 15 which is concentric with and separated from the bore 12 by the forward end 11ª of said support 11. A worm gear 16 operates in said chamber. An extension 17 is formed integral with housing 14 and operating in the chamber 18 thereof is a worm 19 which meshes with and drives said worm gear 16. The extension or casing 17 is disposed vertically and preferably rearwardly of housing 14.

Worm 19 is fixed to the lower end of a vertically disposed counter shaft 20. This shaft is journaled in bearings formed in said extension 17 and the upper end of said shaft carries a comparatively large spur gear 21 which meshes with a pinion 22 mounted on the lower end of a shaft 24 of a vertically disposed motor 25. Gear 21 and pinion 22 constitute a suitable reduction gearing and are enclosed by a casing 26 which is arranged above support 11 and said extension 17. The motor 25 is disposed above said casing 26 and is supported thereby. Thus the worm gear 16 is actuated through said reduction gearing by said motor.

Slidably and non-rotatably mounted in bore 12 is a mandrel 27 which extends a suitable distance longitudinally from said support. A sleeve 28 is revolubly mounted on said mandrel adjacent to the end 11ª of support 11. The inner end 29 of said sleeve bears against said end 11ª and is provided with an exteriorly disposed screw-thread which receives worm gear 16 which latter is formed with a corresponding screw-threaded aperture. The outer end of said sleeve 28 is provided with a head 30 which carries the tool holder mounting or mechanism 31.

A stationary sleeve 32 encloses revoluble sleeve 28 and the outer end 32ª of said sleeve 32 bears against said head 30 while the inner end is flanged as indicated at 32ᵇ and is secured to housing 14 and forms a cover therefor. The revoluble sleeve 28 is therefore supported by the slidable mandrel 27 which extends therethrough and by the stationary sleeve 32 which is fastened to support 11, and encloses said revoluble sleeve.

The electric motor 25 actuates through the reduction gearing 21 and 22 worm gear 16 so that the revoluble sleeve 28 is rotated and the tool holder mounting 31 revolved about the axis of mandrel 27. The arrangement of supporting means both within the revoluble sleeve 28 and exteriorly thereof provide ample and rigid bearing for said revoluble sleeve and eliminate all danger of vibration and chattering so that the tool holder mounting 31 is held steady at all times.

The forward end of mandrel 27 is provided with a bore 34, the inner end of which is formed with a screw thread as indicated at 34ª, while the outer portion is tapered outwardly as indicated at 34ᵇ. A pin 35 has one end screw-threaded as indicated at 35ª for engagement with the threaded end 34ª of bore 34 and has a tapered portion 34ᵇ which fits into the tapered portion 34ᵇ of said bore. A collar 36 is formed on said pin adjacent to said tapered portion and said collar bears against the outer end of mandrel 27. A pair of truncated cone members 37 and 38 is slidably arranged on pin 35 in opposed relation with each other. These cone members are so arranged that they engage with their oppositely disposed tapered faces the ends of a hub A of a wheel B and support the latter in position concentrically with the axis of rotation of sleeve 28.

When the cone members 37 and 38 clamp therebetween the hub of a wheel, member 38 bears against shouldered portion 36 and/or the outer end of mandrel 27, while the member 37 is engaged at its outer end by a sleeve 39 which is slipped over the outer end of pin 35 and is drawn against member 37 by a nut 40 screw-seated on the threaded outer end 41 of pin 35. In this manner the wheel B is securely held in position and the brake drum C thereof is arranged concentrically with the axis of rotation of the machine and is so located that it can be engaged by the cutting tool of the cutting mechanism 31.

The mandrel 27 carries the wheel B and during the operation of the machine said mandrel is moved longitudinally so as to position brake drum C and wheel B relatively to the cutting mechanism 31 which is rotatably mounted but is not movable longitudinally.

For small wheels, such as wheels of passenger cars, the mandrel 27 alone is sufficient to support the car wheel. Where large and heavy wheels, such as truck wheels, are to be operated upon, an additional support 42 is provided for sleeve 39 and outer end of rod 35. This support consists of an upright or standard 44 which may be secured to the floor in spaced relation with base 10 or, as shown in the drawings, said base 10 and said upright 44 can be attached to a sub-base 45. The upper end of upright 44 is bifurcated, as at 44ª, and mounted therein is a horizontally and transversely disposed roller 46 having a V-shaped groove 46ª for receiving sleeve 39. In this manner, the outer end of bar 35 is supported and has an anti-friction bearing in said standard 44 so that mandrel 27 and bar 35 and parts associated therewith can be moved longitudinally with ease. Preferably, upright 44 is adjustable longitudinally of said sub-base and is locked in adjusted position by a bolt 46. As shown, this bolt is eccentrically engaged at its upper end, as indicated at 47 and the lower end of said bolt extends through a slot 48 into said base and is provided with a nut or head 49 which bears against the underside of the slotted portion of said sub-base. The eccentric mounting 47 for the upper end of bolt 46 is operated by a handle 50. By moving said handle downwardly, bolt 46 is released so as to permit the stand or upright 44 to be moved longitudinally of said sub-base. When the handle is moved upwardly into the position shown in the drawings, bolt 46 is drawn upwardly so as to bring the head 49 against the slotted wall of said base and lock the upright against movement.

The longitudinal movement of the mandrel 27 is accomplished by means of a screw 51 which is longitudinally disposed in bore 12 and engages a screw-threaded bore 52 formed in the corresponding end of said mandrel. This screw is revolubly mounted in an end plate 54 by means of a shank portion 51ª which extends therethrough. End plate 54 is attached to support 11 and closes the entrance to bore 12. The outer end of shank portion 51ª has fixed thereon a beveled gear 55 which meshes with a beveled gear 56. Said beveled gears are contained in a housing 57 and beveled gear 56 is fixed to a transverse shaft 58 which is mounted in said housing and extends outwardly therefrom and carries a ratchet wheel 59. This ratchet wheel which is located exteriorly of said housing is adapted to be engaged by a pawl 60 yieldably mounted in an arm 61. Said arm which is preferably of inverted U-shape has its ends loosely mounted on the outer end of shaft 58 to each side of ratchet wheel 59. Pivotally connected to said arm is one end of a connecting link 62, the other end of which is pivotally connected to a rod 64, slidably mounted in bearings 65 exteriorly and rearwardly of support 11 and preferably parallel with the axis of mandrel 27. The other end of bar 64 is engaged by a cam 64ª on worm gear 16 and is reciprocated to oscillate arm 61. On the rearward movement of said arm, as indicated in solid arrow, the lower end of pawl 60 engages one of the teeth of ratchet wheel 59 and rocks shaft 58 a predetermined distance. The beveled gears 56 and 55 transmit this motion to screw 51 so that the latter is actuated and moves the mandrel longitudinally a predetermined distance. The extent of rocking movement of shaft 58 is controlled by an adjusting member 67. This member is loosely mounted on shaft 58 between the inner end of arm 61 and ratchet wheel 59 and is provided with a semi-circular tubular portion 68 which overlies said ratchet wheel 59. One end of said tubular portion is tapered downwardly, as indicated at 69, and terminates adjacent to the lower end of pawl 60. Thus member 67 can be adjusted on shaft 58 so as to position end 69 relatively to pawl 60 whereby the lower end of the latter is engaged by said end 69 to retard or accelerate the moment of engagement of pawl 60 with the teeth of ratchet wheel 59 during the oscillatory movement of arm 61.

As the extent of the movement of the latter is fixed, it will be obvious that retarding the period of engagement between pawl 60 and ratchet wheel 59 will reduce the feeding movement of mandrel 27 while the acceleration of the engagement between said parts will increase the feed travel of the mandrel. Plate 67 is locked in adjusted position by a screw 70 which is seated in one of the walls of said housing 56 and operates through a slot 71 formed in member 67 concentric with the axis of shaft 58. A coiled spring 72 is mounted in arm 61 and serves to bring the pawl 60 into engagement with the ratchet wheel. A knob 74 is attached to the outer end of the shank of pawl 60 whereby the latter can be operated manually.

A coiled spring 75 is placed on rod 64 and bears at one end against bearing 65ᵃ while its other end engages a pin or projection 76 on rod 64. The latter is automatically operated by the actuation of the machine in the direction indicated by arrow (see Fig. 5) and is restored to normal position by said springs 25.

As stated before, the tool carrying mechanism 31 is carried by head 30. This head is formed with an extension 30ᵃ having a flat face 30ᵇ disposed tangentially and to one side of said head (see Fig. 2). A bar 77 is fixed to said extension 30ᵃ against the flat face thereof and extends therefrom rearwardly with respect to the direction of rotation of said head. This bar is of substantial thickness and is dove-tailed in cross section (see Fig. 4) and extends a suitable distance from said extension.

Slidably mounted on said bar is a casting 78. This casting is provided in its base 78ᵃ with a longitudinally disposed slot which is dove-tailed in cross section so as to engage said bar.

Projecting from said casting in a direction opposite to the direction of rotation and formed integral with the base thereof is an extension 79 having a split bearing 80. This bearing is disposed at right angle to bar 77 and has mounted therein a rod or tool holder 81. This tool holder is slidably mounted in said bearing and extends therefrom in a direction away from head 30 and in parallelism with mandrel 27. A tool 82 is fixed to the outer end of said tool holder and projects radially to engage the peripheral wall of a brake drum C when a wheel B is placed on said mandrel.

Split bearing 80 is formed with horizontally disposed portion 80ᵃ which are adapted to be engaged by a screw 83 whereby said bearing 80 can be tightened to clamp the rod 81 in position therein. Preferably extension 79 is provided with a rib 79ᵃ extending from base 78ᵃ to the lower one of lips 80ᵃ. This rib provides reinforcement for said extension and for bearing 80 and prevents breakage or distortion of said extension.

It will be observed that bar 77 is of considerable width and thickness and that the base 78ᵃ of casting 78 has a substantial bearing on said bar so that the tool holder 81 and tool 82 are rigidly supported in position. The tool 82 and tool holder 81 are disposed rearwardly of bar 77 and casting 78 with respect to the direction of travel thereof. This arrangement further increases the efficiency of the machine and insures accurate and smooth cut.

Additional support and reinforcement is provided for bearing 80 through the medium of a rod 84. This rod is disposed on the opposite side of tool holder 81 with respect to bar 77 and parallel with the latter. One end of said rod is anchored in head 30, as indicated at 84ᵃ, and the other end slidably engages a split bearing 85 formed integral with and extending from bearing 80 at right angle thereto. Bearing 85 is provided with lips 86 which are engaged by a wing screw 87 whereby said bearing can be tightened to clamp rods 84. This rod 84 provides a rigid support for bearing 84 on one side of the tool holder 81 while bar 77 provides rigid support on the other. Said bar 84 takes up the strain to which the extension 79 may be subjected and prevents distortion of said extension and maintains the tool holder 81 and the tool 82 at all times in proper position.

Extending from casting 78 in opposite direction with respect to extension 79 is a member 88 having a screw-threaded aperture 89 disposed parallel with bar 77. As shown, this member is preferably formed separate from said casting and is secured thereto so as to bridge or extend transversely of bar 77. A screw 90 is disposed parallel with bar 77 and is screw-seated in said aperture 89.

One end of said screw is revolubly mounted in a plate 91 which is secured to extension 30ᵃ of head 30 at right angle to bar 77. A handle 92 is attached to the projecting end of said screw adjacent to one side of plate 91 and provides means whereby said screw can be manually operated.

As said screw is held against longitudinal movement by its mounting in said plate 91, the rotation of said screw will cause member 88 and casting 78 to move longitudinally of bar 77. This movement of said casting will cause the tool holder 81 and tool 82 to move so that the latter can be adjusted radially with respect to the axis of the mandrel and adjusted relatively to the brake drum of a wheel.

It is understood that the wing screw 87 has to be released so as to loosen bearing 85 with respect to rod 84 before the casting 78 can be adjusted. After such adjustment the casting 78 and the tool holder 81 are locked in adjusted position by tightening said wing screw 87.

A switch 94 is arranged on member 11 for controlling the circuit of motor 25. A rod 95 is fixed to mandrel 27 and in the present case extends rearwardly therefrom through the rear end of said support and has its end rebent as indicated at 95ᵃ and disposed parallel with and above said member 11. A stop 96 is adjustably fixed on said rod and engages said switch to open the circuit of the motor when the mandrel 27 and the brake drum carried thereby reaches its extreme inward position. Stop 96 can be adjusted longitudinally on end 95ᵃ so as to shut off the motor at the desired time and in accordance with the width of the brake drum. The inward movement of the mandrel and the brake drum is accomplished through the engagement of screw 51 with said mandrel and through the actuating means operable by cam 64ᵃ on a worm gear 16. The mandrel can be also manually actuated by a handle 97 fixed to shaft 58.

The use of bars 77 and 84 for supporting the sliding block 78 forms a four point support for the cutting tool holder 81 so that the latter is accurately held in place and insures a smooth cut. The parallel arrangement of said bars and the disposal thereof each to one side of the axis of mandrel 27 forms a rigid support for the cutting tool mounting and prevents springing or distortion of said blocks 78. Also the engagement of split sleeve 85 with bar 84 forms an additional lock for block 78, the screw 90 and the threaded lug 88 forming the other lock for the mounting.

The construction of the machine is such that both the brake drum and the tool are held in proper relationship at all times and all vibration or chatter of either or both members is guarded against, thereby insuring a smooth cut. Manual adjustment is provided for the cutting tool holder so that it may be adjusted longitudinally and the latter is so arranged as to operate upon either the outer or inner peripheral faces of the brake drum. The machine can be used for operating upon both large and small brake drums and can be supported either on its own base 10 or the support 11 can be attached to a bench.

The mandrel 27 is held against rotative movement by a screw 98 which is screw-seated in support 11 and has its inner end engaging a slot 99 formed longitudinally in the peripheral face of said mandrel. A lock nut 100 locks the screw 98 in position. Thus the mandrel is free to move longitudinally so as to feed the brake drum relatively to the cutting tool but said mandrel is held against rotative movement so that the brake drum cannot rotate while the cutting tool 82 revolves by virtue of its association with the revoluble sleeve 28.

While I have shown and described herein the preferred form of my invention, it is to be understood that various changes in the construction and arrangement of parts of my brake drum truing machine can be made and substituted for those herein described without departing from the spirit of my invention.

I claim:

1. A brake drum truing machine comprising a stationary support, a mandrel slidably mounted therein exteriorly of said support, said mounting being provided on its outer end with a head, a tubular bearing fixed to said support and enclosing and supporting said mounting, driving means fixed to the inner end of said mounting, said tubular bearing cooperating with said driving means and with said head for holding said mounting against longitudinal movement, a mounting revolubly mounted on said mandrel and held against longitudinal movement, a tool holder adjustably mounted on said mounting and extending therefrom parallel with said mandrel, means for fixedly supporting a brake drum on said mandrel coaxially therewith, and a cutting tool carried by said tool holder and engaging the peripheral face of said drum, said mandrel being movable longitudinally during the cutting operation so as to move said drum axially relatively to said revolving cutting tool.

2. A brake drum truing machine comprising a stationary support, a mandrel slidably mounted therein and held against rotative movement, a mounting revolubly mounted on said mandrel adjacent to one end of said support, a tubular bearing enclosing said mounting and fixed to said end of said support, means for holding said mounting against longitudinal movement, means for fixedly supporting a brake drum on said mandrel coaxially therewith, a cutting tool carried by said mounting and engaging the peripheral face of said brake drum, and means for moving said mandrel and said brake drum longitudinally of said cutting tool.

3. A brake drum truing machine comprising a stationary support, a mandrel slidably mounted therein and held against rotative movement, a mounting revolubly mounted on said mandrel and provided with a tubular portion enclosing said mandrel and terminating adjacent to said support, a stationary sleeve secured to said support and enclosing said tubular portion of said mounting and forming an external bearing therefor whereby said mounting is held against longitudinal movement and is free to rotate, means for fixedly supporting a brake drum on said mandrel coaxially therewith, a tool holder fixed to said mounting and extending therefrom parallel with said mandrel, and a cutting tool carried by said holder for engaging the peripheral face of said brake drum, said brake drum being slidable with said mandrel longitudinally relatively to said cutting tool.

4. A brake drum truing machine comprising a stationary support, a mandrel slidably mounted therein and held against rotative movement, a mounting revolubly mounted on said mandrel and provided with a tubular portion enclosing said mandrel and terminating adjacent to said support, a stationary sleeve secured to said support and enclosing said tubular portion of said mounting and forming an external bearing therefor whereby said mounting is held against longitudinal movement and is free to rotate, means for fixedly supporting a brake drum on said mandrel coaxially therewith, a tool holder fixed to said mounting and extending therefrom parallel with said mandrel, and a cutting tool carried by said holder for engaging the peripheral face of said brake drum, and means carried by said support and engaging said mandrel for feeding it and said brake drum longitudinally during the cutting operation.

5. A brake drum truing machine comprising a stationary support, a mandrel slidably mounted therein and held against rotative movement, a mounting having a tubular portion revolubly mounted on said mandrel adjacent to said support, a stationary sleeve enclosing said tubular portion and forming an external bearing therefor, a tool holder adjustably mounted on said mounting and extending therefrom parallel with said mandrel, means for fixedly supporting a brake drum on said mandrel in spaced relation with said mounting, a cutting tool carried by said tool holder and engaging the peripheral face of said brake drum, and means operable in time relation with said cutting tool for moving said mandrel and said brake drum longitudinally relatively to said tool.

6. A brake drum truing machine comprising a stationary support, a mandrel slidably mounted therein and held against rotative movement, said mandrel having one end projecting therefrom, a mounting revolubly mounted on said mandrel adjacent to said support and held against slidable movement, a tool holder carried by said mounting in spaced parallel relation with said mandrel, means for rigidly supporting a vehicle wheel having a brake drum on the projecting end of said mandrel concentrically therewith, a cutting tool carried by said tool holder for engaging the peripheral wall of said brake drum, a screw revolubly disposed in said support and engaging a threaded bore in the inner end of said mandrel, and means for operating said screw whereby said mandrel and said brake drum are moved longitudinally relatively to said cutting tool.

7. A brake drum truing machine comprising a stationary support, a mandrel slidably mounted therein and held against rotation, said mandrel having one end projecting from said support, a mounting having a tubular portion revolubly mounted on said mandrel adjacent to said support, a sleeve secured to said support and enclosing said tubular portion whereby the latter and said mounting are held against longitudinal movement, said sleeve forming an external bearing and said mandrel forming an internal bearing for said mounting whereby the latter is provided with large bearing surfaces which prevent vibration and chattering, a tool holder carried by said mounting in spaced parallel relation with said mandrel, means for rigidly supporting a vehicle wheel having a brake drum on the projecting end of said mandrel concentrically therewith, a cutting tool carried by said tool holder for engaging the peripheral wall of said brake drum, and means engaging said holder and moving the latter and said vehicle wheel axially relatively to said cutting tool.

8. A brake drum truing machine comprising a stationary support, a mandrel slidably mounted therein and projecting therefrom, means in said support for engaging said mandrel and holding it against rotative movement and permitting slidable movement thereof, a mounting having a tubular portion revolubly mounted on said mandrel exteriorly of said support, means for engaging said tubular portion and holding said mounting against longitudinal movement but permitting revoluble movement thereof, means for rigidly supporting a vehicle wheel having a brake drum on the projecting end of said mandrel concentrically therewith and with said mounting, a tool holder carried by said mounting in spaced relation with said mandrel, a cutting tool carried by said holder and engaging the peripheral wall of said brake drum, and a screw revolubly mounted in said support and engaging a screw threaded bore in the inner end of said mandrel, said screw being operable to feed said mandrel and said brake drum longitudinally relatively to said cutting tool.

9. A brake drum truing machine comprising a stationary support, a mandrel slidably mounted therein and extending therefrom, means in said support for engaging the inner end of said mandrel and holding it against rotative movement, a mounting having a tubular portion revolubly mounted on said mandrel exteriorly of said support, a sleeve fixed to said support and enclosing said tubular portion and forming an external bearing therefor, said mandrel forming an internal bearing for said mounting, means for securing a brake drum to the projecting end of said mandrel concentrically therewith, a tool holder adjustably mounted in said mounting and extending toward said brake drum, a cutting tool carried by said holder and engaging the peripheral wall of said brake drum, means engaging said tubular portion for rotatively actuating said mounting and parts carried thereby, and means engaging said mandrel for feeding the latter and said brake drum coaxially with the axis of rotation of said cutting tool.

10. A brake drum truing machine comprising a stationary support, a mandrel slidably mounted therein and held against revoluble movement, means for fixedly supporting a brake drum on said mandrel, a cutting tool mounting including a sleeve revolubly mounted on said mandrel, a driving mechanism operatively associated with said revoluble sleeve, and a cutting tool holder carried by said mounting, said cutting tool holder being adjustable longitudinally of the axis of rotation and said mounting being adjustable radially thereof.

11. A brake drum truing machine comprising in combination a stationary support, a mandrel slidably mounted therein and held against revoluble movement, means for fixedly supporting a brake drum on said mandrel, a cutting tool mounting including a sleeve revolubly mounted on said mandrel and held against longitudinal movement, a worm gear fixed to the inner end of said sleeve, a tool holder carried by said mounting, and a stationary sleeve fixed to said support and enclosing said revoluble sleeve and forming external bearing therefor.

12. A brake drum truing mechanism comprising in combination a stationary support, a mandrel slidably mounted therein, means for preventing revoluble movement of said mandrel, means engaging the outer end of said mandrel for fixedly supporting thereon a brake drum, a sleeve revolubly mounted on said mandrel and held against longitudinal movement, a cutting tool mounting carried by the outer end of said sleeve and adjustable radially relatively to the axis of rotation, a cutting tool holder carried by said mounting and adjustable thereby longitudinally of the axis of rotation, driving means operatively associated with said revoluble sleeve for actuating the latter, and means operable by said driving means for feeding said mandrel longitudinally.

13. In a machine of the class described, the combination of a stationary support, a mandrel slidably and non-rotatively mounted therein, means for fixedly supporting a brake drum on the outer end of said mandrel, a sleeve revolubly mounted on said mandrel, a gear fixed to the inner end of said sleeve, a cutting tool mounting fixed to the outer end of said revoluble sleeve, means engaging said gear for actuating said revoluble sleeve, a stationary sleeve fixed to said support and enclosing said gear and terminating adjacent to said mounting, thereby holding said revoluble sleeve against longitudinal movement, a support bar fixed to said mounting to one side of the axis of rotation and extending laterally therefrom, a block slidably mounted on said bar and adjustable radially, and a cutting tool holder carried by said block and adjustable longitudinally of the axis of rotation and extending toward said brake drum.

14. In a machine of the class described, the combination of a stationary support, a mandrel slidably and non-rotatably mounted therein, means for fixedly supporting a brake drum on the outer end of said mandrel, a sleeve revolubly mounted on said mandrel, a gear fixed to the inner end of said sleeve, a cutting tool mounting fixed to the outer end of said revoluble sleeve, means engaging said gear for actuating said revoluble sleeve, a stationary sleeve fixed to said support and enclosing said gear and terminating adjacent to said mounting, thereby holding said revoluble sleeve against longitudinal movement, a support bar fixed to said mounting to one side of the axis of rotation and extending laterally therefrom, a block slidably mounted on said bar and adjustable radially, a cutting tool holder carried by said block and adjustable longitudinally of the axis of rotation and extending toward said brake drum, and means for moving said mandrel longitudinally and moving said brake drum relatively to said cutting tool holder.

15. In a brake drum truing machine, the combination with a stationary support, of a mandrel slidably and non-rotatably mounted therein, means for feeding said mandrel longitudinally in said support, a sleeve revolubly mounted on said mandrel, a tubular bearing fixed to one end of said support and enclosing said sleeve, means on said sleeve cooperating with said tubular bearing for holding said sleeve against longitudinal movement, a tool holder mounting carried by the outer end of said sleeve, and means for fixedly mounting a brake drum carrying wheel on the outer end of said mandrel coaxially with the axis of rotation.

GEORGE A. DELF.

CERTIFICATE OF CORRECTION.

Patent No. 1,925,177. September 5, 1933.

GEORGE A. DELF.

It is hereby certified that error appears in the printed specification of the above numbered patent requiring correction as follows: Page 4, line 26, claim 1, after "therein" insert the words "and held against revoluble movement, a mounting revolubly mounted on said mandrel"; and that the said Letters Patent should be read with this correction therein that the same may conform to the record of the case in the Patent Office.

Signed and sealed this 24th day of October, A. D. 1933.

F. M. Hopkins (Seal) Acting Commissioner of Patents.